US010212495B2

(12) United States Patent
Lloyd et al.

(10) Patent No.: US 10,212,495 B2
(45) Date of Patent: *Feb. 19, 2019

(54) PROGRAMMABLE MONITORING SYSTEM

(71) Applicant: ALCHERA INCORPORATED, Orinda, CA (US)

(72) Inventors: Lester John Lloyd, Orinda, CA (US); Timothy Patrick Lloyd, Orinda, CA (US); Lauren Felix Yazolino, Orinda, CA (US)

(73) Assignee: ALCHERA INCORPORATED, Orinda, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/872,447

(22) Filed: Jan. 16, 2018

(65) Prior Publication Data

US 2018/0206009 A1    Jul. 19, 2018

Related U.S. Application Data

(63) Continuation of application No. 14/211,684, filed on Mar. 14, 2014, now Pat. No. 9,913,003.

(60) Provisional application No. 61/784,397, filed on Mar. 14, 2013, provisional application No. 61/857,549, filed on Jul. 23, 2013, provisional application No. 61/924,576, filed on Jan. 7, 2014.

(51) Int. Cl.
G08B 21/02 (2006.01)
H04Q 9/00 (2006.01)
G08B 21/04 (2006.01)

(52) U.S. Cl.
CPC ............... *H04Q 9/00* (2013.01); *G08B 21/02* (2013.01); *G08B 21/04* (2013.01); *G08B 21/0407* (2013.01); *G08B 21/0423* (2013.01); *H04Q 2209/40* (2013.01); *H04Q 2209/50* (2013.01); *H04Q 2209/823* (2013.01)

(58) Field of Classification Search
CPC .... G08B 21/02; G08B 21/04; G08B 21/0407; G08B 21/0423; G08C 19/00; H04Q 2209/40; H04Q 2209/50; H04Q 2209/823
See application file for complete search history.

(56) References Cited

U.S. PATENT DOCUMENTS

| 4,494,553 | A * | 1/1985 | Sciarra | A61B 5/0002 600/534 |
| 5,907,279 | A * | 5/1999 | Bruins | G08B 25/003 340/12.23 |
| 6,080,106 | A * | 6/2000 | Lloyd | A61B 5/0002 600/300 |
| 6,168,639 | B1 * | 1/2001 | Taketani | H01G 9/0036 205/80 |
| 6,614,884 | B2 * | 9/2003 | Jang | H04M 11/04 379/40 |

(Continued)

Primary Examiner — Andrew W Bee
(74) Attorney, Agent, or Firm — Karl Bozicevic; Bozicevic, Field & Francis LLP

(57) ABSTRACT

The programmable monitoring system comprises one or more motion sensors, one or more temperature sensors, one or more door sensors and one or more pill box sensors. Each sensor is tagged with a unique code readable by a smart phone camera and software program which allows alarms on the smart phone to be set. The alarms are individually set for any or all of the sensors based on habits of the person being monitored.

9 Claims, 11 Drawing Sheets

(56) References Cited

U.S. PATENT DOCUMENTS

| | | | |
|---|---|---|---|
| 2004/0133453 A1* | 7/2004 | Jomini | A61B 5/1117 |
| | | | 705/2 |
| 2005/0131736 A1* | 6/2005 | Nelson | G06Q 50/22 |
| | | | 705/2 |
| 2006/0197660 A1* | 9/2006 | Luebke | G08B 25/009 |
| | | | 340/539.26 |
| 2007/0063833 A1* | 3/2007 | Kates | G08B 25/009 |
| | | | 340/521 |
| 2008/0074262 A1* | 3/2008 | Paulkovich | G06Q 10/087 |
| | | | 340/572.1 |
| 2008/0081594 A1* | 4/2008 | Lee | H04M 1/72544 |
| | | | 455/412.2 |
| 2008/0238692 A1* | 10/2008 | Dayton | G07C 3/00 |
| | | | 340/573.1 |
| 2009/0083205 A1* | 3/2009 | Dishongh | G06K 9/00335 |
| | | | 706/46 |
| 2011/0090085 A1* | 4/2011 | Belz | G08B 21/0423 |
| | | | 340/573.1 |
| 2012/0086573 A1* | 4/2012 | Bischoff | G06F 19/3418 |
| | | | 340/573.1 |

* cited by examiner

Weekly Report - Francis Example 2/9/2014 to 2/15/2014
Daytime Hours: 7 AM - 11 PM    Nighttime Hours: 11 PM - 7 AM Wakeup Time

| | Sunday | Monday | Tuesday | Wednesday | Thursday | Friday | Saturday |
|---|---|---|---|---|---|---|---|
| Wakeup Time | 7:22 AM | 7:19 AM | 8:58 AM | 8:09 AM | 10:01 AM | 7:16 AM | 8:38 AM |

Bathroom Visits by Time of Day

| TOD | Sunday | Monday | Tuesday | Wednesday | Thursday | Friday | Saturday |
|---|---|---|---|---|---|---|---|
| Daytime | 14 | 9 | 10 | 11 | 13 | 7 | 10 |
| Nighttime | 1 | 2 | 2 | 1 | 1 | 2 | 4 |

Mobility - Room Visits by Time of Day

| TOD | Sunday | Monday | Tuesday | Wednesday | Thursday | Friday | Saturday |
|---|---|---|---|---|---|---|---|
| Daytime | 122 | 104 | 105 | 118 | 129 | 77 | 111 |
| Nighttime | 4 | 12 | 9 | 5 | 6 | 9 | 18 |

Kitchen Visits

| | Sunday | Monday | Tuesday | Wednesday | Thursday | Friday | Saturday |
|---|---|---|---|---|---|---|---|
| Kitchen Visits | 18 | 21 | 17 | 20 | 16 | 14 | 14 |

Keys Out

| Day | Time out | Time Back |
|---|---|---|
| 2/10/2014 | 6:27 AM | 6:35 AM |
| 2/15/2014 | 12:13 PM | 3:13 PM |

Home Care Agency
(999) 999-9999

Date: _____

FIG. 8

PROGRAMMABLE MONITORING SYSTEM

FIELD OF THE INVENTION

The invention relates to home monitoring systems in general, more specifically to such systems which can be easily installed, and unobtrusively provide information on the movement and activities of a person by way of a map of the home generated on the screen of a mobile device such as a smart phone.

BACKGROUND OF THE INVENTION

There are a number of monitoring systems known. Some systems include a device worn by an individual which sends a signal requesting an emergency response when activated. Such systems are sometimes referred to as personal emergency response systems (PERS) (see U.S. Pat. No. 6,168,639). Other systems directly monitor a patient's vital signs such as temperature, heart rate, blood pressure, etc. (see U.S. Pat. No. 4,494,553). Still other systems monitor an individual's weight and obtain information by asking the patient a series of questions designed to determine the patient's wellbeing and need for medical care (U.S. Pat. No. 6,080,106). There are other systems and each has a specific purpose which is accomplished in a somewhat different way. These systems generally endeavor to reduce overall medical costs by providing information related to a possible need for medical care back to a central location.

SUMMARY OF THE INVENTION

A programmable home monitoring system is disclosed wherein the system is programmed based on the habits of individuals being monitored. The system includes several monitors which send signals to a central processing unit (CPU) in the home. The signals are then sent from the CPU to a mobile device such as a smart phone device of an individual monitoring the person in the home. The smart phone is programmed to generate a map of the home and to sound an alert when a preprogrammed parameter is exceeded which parameter may be related to habits of the individual being monitored. The monitors can include motion sensors, a pill box opening detector, home door closure detectors, and a temperature gauge. Each monitor is uniquely tagged with an identification name readable by a smart phone camera and connected software program. The unique smart phone readable tags make it possible to easily install the systems and program alarm parameters for different monitoring devices related to the habits of the individual being monitored.

An aspect of the invention provides a motion pattern based alarm system whereby the daily motions of an individual being monitored are compared against past motion patterns of that individual and/or a standard norm. When the person's motion pattern deviates from a past pattern or the standard norm by a set amount, e.g. 10%, 20%, 30%, 40%, etc. 100%, 200%, 300%, etc. The system enters an alarm and/or provides a notification to a caregiver or other person monitoring the system.

An aspect of the invention is providing an opportunity for the individual being monitored to remain in the home and defer the expenses of assisted care living.

Another aspect of the invention is that it provides comfort to an individual carrying out the monitoring by generating a schematic map of the home on a smart phone screen which shows real time information on activities of a loved one without actually being there in person.

An aspect of the invention is a monitoring system with alarms individually programmed by the user based on habits of the person being monitored.

Another aspect of the invention is providing a pre-packaged system with a plurality of monitors uniquely tagged for specific placement.

Yet another aspect of the invention is that the unique tags are readable via a smart phone camera such that when read a screen appears allowing for entry of alarm parameters and the creation of a room or area on a schematic map.

Still yet another aspect of the invention is that the alarm parameters can be set and re-set based on actions such as (a) habits, (b) changing habits of the individual being monitored; (c) feedback from the individual being monitored; and (4) observation of an individual carrying out the monitoring.

Another aspect of the invention is a program which allows the creation of a schematic map of the home of the individual being monitored using icons representative of rooms in the home.

Yet another aspect of the invention is a program which allows the map created by the user to be viewed on a smartphone tablet, laptop or PC screen showing movement of the individual being monitored from room to room.

Another aspect of the invention is the ability of the person monitoring an individual to view the schematic map to show room occupancy, time in a room, time on a bed, chair, or other location, temperature in the room, temperature of a stove, use of a toilet or shower and provide historical statistics back to a person monitoring.

In another aspect of the invention the schematic map shows the last indicated location of the individual being monitored.

Another aspect of the invention is a programmable monitoring system which comprises multiple monitors including a first monitoring device, second monitoring device, third monitoring device, fourth monitoring device, each of which is marked with a unique tag readable by a smart phone camera and related software and each of which is designated uniquely to a specific room or area of a home being monitored wherein the program receiving information from the monitors allows for an alarm to be sent specific to each monitor and specific to an action, lack of action or habit of the individual being monitored.

Another aspect of the invention is using a plurality of motion sensors within a single location in a home of an individual being monitored in order to determine if both sensors are monitoring the same space and/or if both sensors are monitoring motion of a single individual.

Another aspect of the invention is a system wherein information is obtained from multiple monitors and analyzed over time in order to determine whether more than a single individual is present in the home.

Still another aspect of the invention is the use of a plurality of monitors throughout the home which detect multiple parameters including motion, humidity, and temperature and coordinate those parameters in a manner so as to determine when the home is empty as opposed to being occupied by a person who is not moving which method can include an analysis of exterior doors being opened and closed as well as the normal habits of the individual being monitored.

These and other objects, advantages, and features of the invention will become apparent to those persons skilled in the art upon reading the details of the programmable system as more fully described below.

BRIEF DESCRIPTION OF THE DRAWINGS

The invention is best understood from the following detailed description when read in conjunction with the accompanying drawings. It is emphasized that, according to common practice, the various features of the drawings are schematic and are not to-scale. On the contrary, the dimensions of the various features are arbitrarily expanded or reduced for clarity. Included in the drawings are the following figures:

FIG. 8 is a schematic example of a report showing different activities over the period of a week.

DETAILED DESCRIPTION

Figure 1:
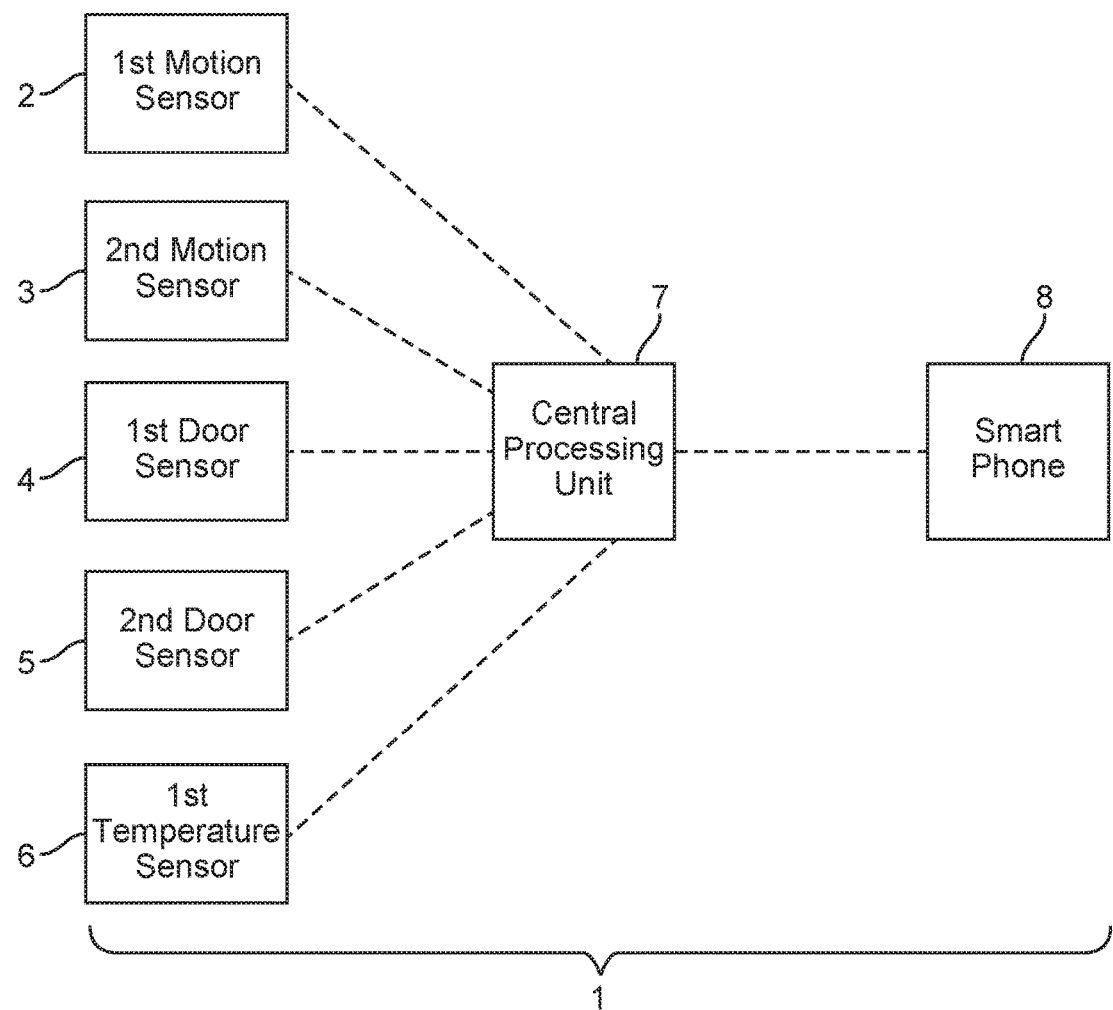
FIG. 1 is a schematic diagram of an embodiment of the programmable monitoring system of the invention.

Before the present programmable system and methods of monitoring are described, it is to be understood that this invention is not limited to particular system and method described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, some potential and preferred methods and materials are now described. All publications mentioned herein are incorporated herein by reference to disclose and describe the methods and/or materials in connection with which the publications are cited. It is understood that the present disclosure supercedes any disclosure of an incorporated publication to the extent there is a contradiction.

It must be noted that as used herein and in the appended claims, the singular forms "a", "an", and "the" include plural referents unless the context clearly dictates otherwise. Thus, for example, reference to "a monitor" includes a plurality of such monitors and reference to "the parameter" includes reference to one or more parameters and equivalents thereof known to those skilled in the art, and so forth.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

The system of the invention can be used to monitor elderly individuals in their home. An object of the monitoring can be providing a means for an elderly person to remain in their home for a longer period of time before requiring expensive assisted living care. Relatives of these elderly individuals can play a role in allowing the elderly to remain living independently for longer periods if given the right tools. The monitoring system disclosed here is such a tool.

The system is substantially more likely to be used if it is easily installed and programmed and particularly useful if alarms can be programmed in a manner tailored specifically to the habits of the individual being monitored. For example, individuals may get up in the morning and go to bed at night in a regular pattern. In addition, some individuals leave the home and return home, take medications, cook, and eat about the same time every day. However, that pattern will be different for different people and can change over time.

FIG. 1 is a schematic view of an embodiment of a programmable monitoring system 1 of the invention. The first motion sensor 2, second motion sensor 3, first door sensor 4, second door sensor 5, and temperature sensor 6 are all in wireless (dotted lines) connection with a central processing unit (CPU) 7. The CPU 7 is in wireless connection with another computer such as a mobile processing device, for example a smart phone, lap top computer, electronic pad or similar device. Any of the sensors 2-6 or other sensors not shown can be uniquely associated with a particular area or room of a home. Accordingly, when the sensors are placed within a room those sensors can represent that room or an item within the room as shown and described further below with respect to FIG. 4-6.

Figure 2:
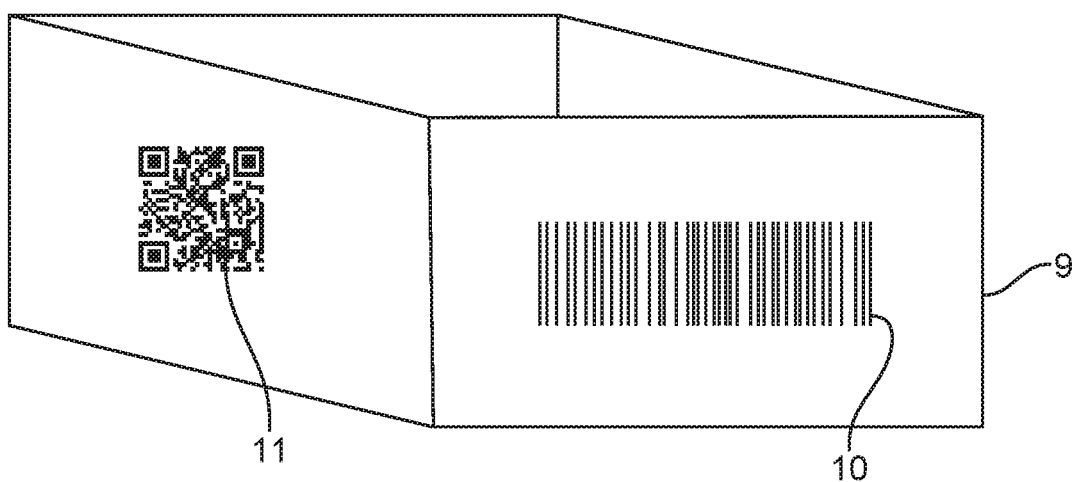
FIG. 2 is a schematic diagram of a sensor device marked with a unique tag readable via a smart phone camera and software program.

FIG. 2 is a schematic view of a sensor 9 marked with a unique tag via a matrix bar code 10, and/or quick response code (QR code) 11. The tag is readable using a smart phone or lap top camera and matching software. Each bar code 10 can be supplemented with a written description of an area, room or object within a room as shown within FIGS. 4-6. Thus, a particular bar code or QR code can be uniquely associated with a room such as a bedroom 23 as shown within FIG. 4. Thus, the unique tag makes it possible to easily prepare a map of the users home as shown within FIGS. 5 and 6.

Figure 3:
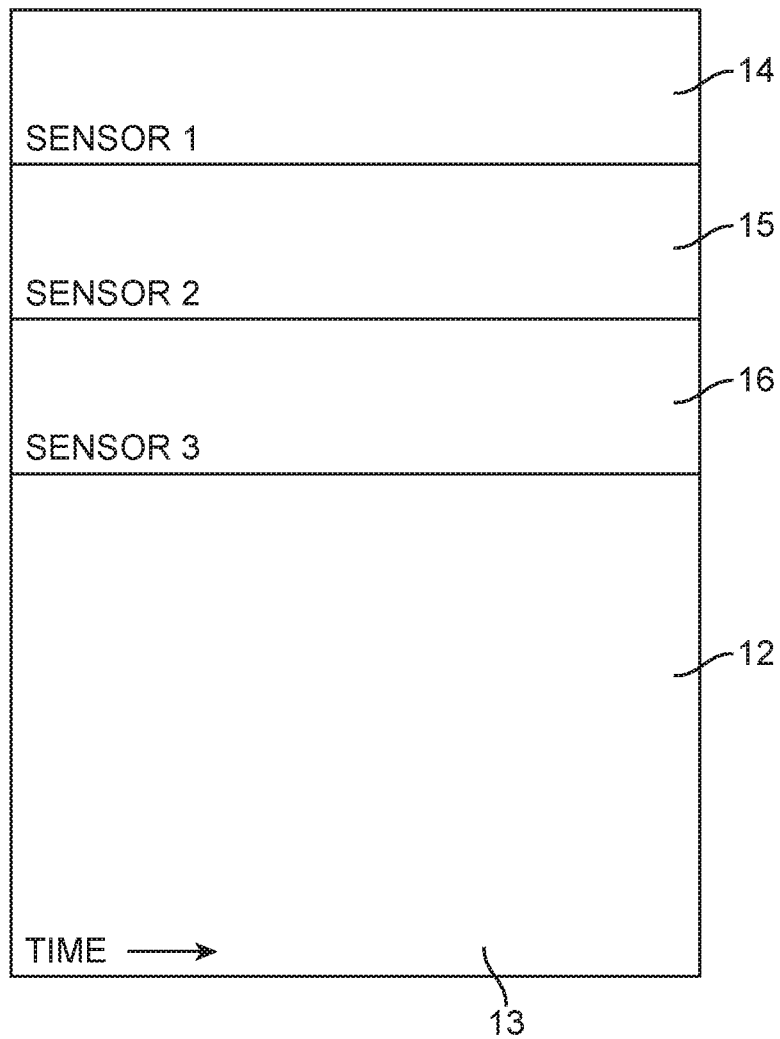
FIG. 3 is a schematic diagram of a smart phone screen generated by a software program of the invention.

FIG. 3 is a schematic view of a smart phone face 12 showing a time line 13 moving from left to right. A separate line 14, 15, and 16 is shown for each sensor. The alarms are set by moving an icon on the time line to the desired point. For example, if time line 14 is set for 9:15 am the alarm will signal an alert if a motion sensor signal has not detected movement by 9:15 am every morning. This alarm time might be set if the individual being monitored were expected to get out of bed each day by 9:00 am.

The programmable monitoring systems may be sold as an easily installable kit. The kit may comprise a plurality of monitors including motion sensors, temperature sensors, as well as pill box opening detectors. The package may include written instructions, and advice on how to best utilize the system. The written instructions may include reference to a smartphone program or app which directs the installation steps. The installation app may provide specific feedback after individual motion sensors or other monitors are installed thereby providing the individual installing the system with real time step by step feedback as to the functionality of the sensors and monitors, the correctness of their installation and their utility within the environment they are actually being used. The sensor may have (1) a directional indicator on its surface such as one or more arrows to show the direction the sensor should face; (2) a peel off layer with an adhesive underneath to allow the sensor to be easily and securely attached to a wall or other surface; (3) a unique tag such as a matrix bar code and/or quick response code (QR code) readable by a smart phone camera and related programmable software, and (4) an electrical insulation strip to be removed from the battery circuit at installation which disconnects the battery from the circuitry in storage before installation to preserve battery life.

The unique tag makes installation of the system fast and simple. Once the tag is read by the smart phone the related software program in the phone generates a screen which provides a series of prompts which allow the user to set alarm parameters relating to that particular sensor. For example, a monitor sensor alarm parameter can be set to trigger an alarm if motion in a bedroom is not detected within some given period of time (e.g. 15 minutes) of the time the individual being monitored habitually gets up each morning. The system may be designed such that particular sensors or monitors are designated for particular rooms. Thus, for example, sensors may be marked for "kitchen", "bathroom", and "bedroom" etc. so as to simplify the installation and ensure that particular types of sensors and monitors are included within the correct room.

It is also possible to interrelate the alarm parameters settings of two or more sensors. For example, if a temperature sensor indicates a stove is on, a motion sensor can be programmed to signal and alert if no motion is detected in the area of the stove in a given period of time. Alternatively, the temperature sensor program can be integrated with the door opening alarm to signal an alert if the stove is on and an outside door has been opened indicating the individual being monitored has left the house. Other combinations of integrations of sensor alarm settings will occur to those skilled in the art upon reading the disclosure.

Those skilled in the art will understand that a range of different types of motion sensors, temperature sensors, pill box opening sensors, and door opening sensors and the like are marketed and such devices and variations thereof can be used in connection with the present invention. Reference is made to U.S. Pat. No. 7,319,853 issued Jan. 15, 2008 which is incorporated herein by reference in its entirety as are the patents and publications cited therein.

System Overview

The system is designed in order to monitor an individual which may be an elderly person and particularly an elderly person living alone with some physical and/or mental limitations. A monitoring individual which may be a family member or group of family members can continually be informed as to the status of the monitored individual with a smartphone application which includes customized alerts when the monitored individual exhibits or fails to exhibit certain behaviors detected by sensors.

The overall system is a passive system requiring no training or interaction on the part of the individual being monitored or the individual or individuals carrying out the monitoring. The monitored individual is monitored by a set of home sensors such as a motion detector or group of motion detectors, temperature detector, door position detector, each of which may be set to signal alarms when particular habits of the monitored individual are varied from.

The system can include an electronic key fob which can be placed on a key ring of the individual. The system can also include a pill box monitor to track medication taken by the monitored individual. The system can also be designed to monitor both inbound and outbound phone calls which are logged by the individual providing the time and phone number as well as the length of the call. A personal emergency response system (PERS) device can be provided to the individual being monitored. An alternative program permits the emergency alert to be sent to the family caregivers before an emergency call is placed to the emergency service provider that permits any person monitoring the system to intervene directly. The PERS system includes a button which when activated can connect the individual directly to a company emergency call center which provides for 24 hour 7 day a week support and/or dial 911 and contact the local emergency services department.

The system makes it possible for multiple caregivers such as relatives, friends, acquaintances or caregiving professionals to monitor a single individual or to monitor multiple individuals simultaneously. The system is programmable to send messages to any number of caregivers based on customized alarms which may be standardized or unique to the particular individual being monitored.

The system may include a lead caregiver who is the designated administer and manager when multiple individuals are involved in monitoring. The lead caregiver controls the methods of payment, the initial system setup, parameters for alerts and allows other individuals and caregivers to be added to the system. The system can include a "call list" which is a list of caregivers or others simply monitoring the system and individual members of the call list can have different parameters to provide alerts relative to the individual being monitored. The system permits alerts to be sent to a list of individuals in a specified sequence and to end further notification when the alert is acknowledged by a caregiver.

Programmable Monitoring System

An aspect of the invention is a programmable monitoring system comprised of a plurality of different monitoring devices and a program for receiving information from those devices. The system may comprise a first monitoring device for monitoring motion, a second monitoring device for monitoring motion, a third monitoring device for detecting temperature and a fourth monitoring device for detecting the opening and closing of the door, and other devices. Each of the monitoring devices may be marked with a unique tag readable by a smartphone camera and related software program. The system includes a program for receiving information from each of the monitoring devices and allows for alarms to be sent from a smartphone device based on information received from all or any of the monitoring devices. The program can allow for alarms to be individually set based on habits of a particular individual being monitored. The unique tags on the monitoring devices may be matrix bar code tags, quick response (QR) code tags and/or tags related to electrical resistance of the material.

The system may be individually programmed based on habits such as the time which an individual wakes up, goes to sleep, enters specified rooms, leaves the house, eats, takes medication or uses a stove. The system is capable of learning based on factors such as the movement of the individual being monitored and their habits including cooking, TV watching, bathroom use, exercise, etc. and as such the system can recommend alarms being sent based on monitored behavior over a period of time such as one week, one month, etc.

The program of the system creates a screen on a smartphone which is used for monitoring signals received from each of the monitoring devices connected to the system.

A special installation screen for the smartphone is provided to the user for use during installation that permits a test of each sensor as it is installed in the home of the person being monitored. This is useful because at installation each sensing device is connected by the communication system to the CPU and acknowledged by the system for successful connection and that information transmitted to the installer to assure a successful installation.

Figure 4:
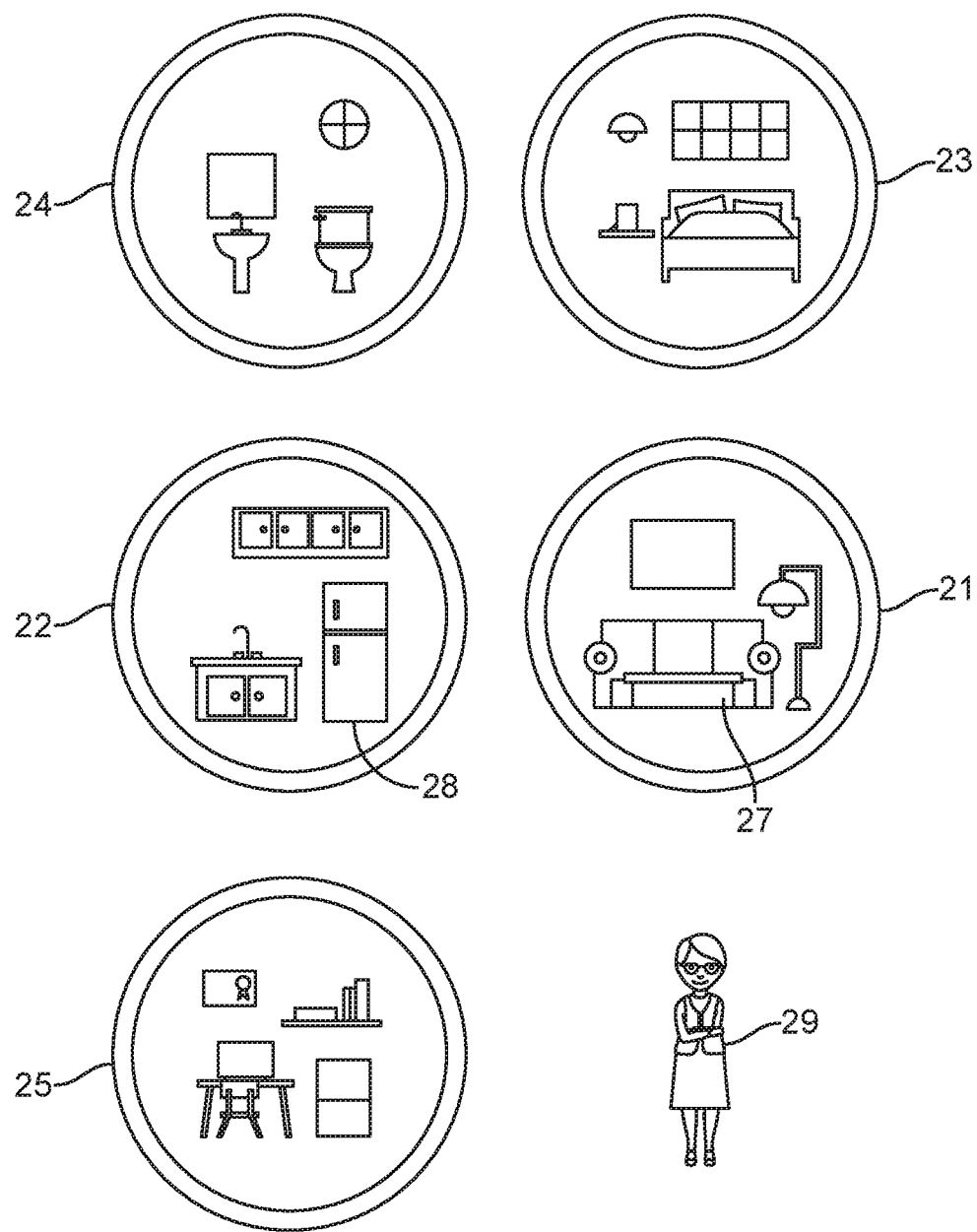
FIG. 4 is a schematic diagram of bubble icons useful in creating a map of a home.
Figure 5:
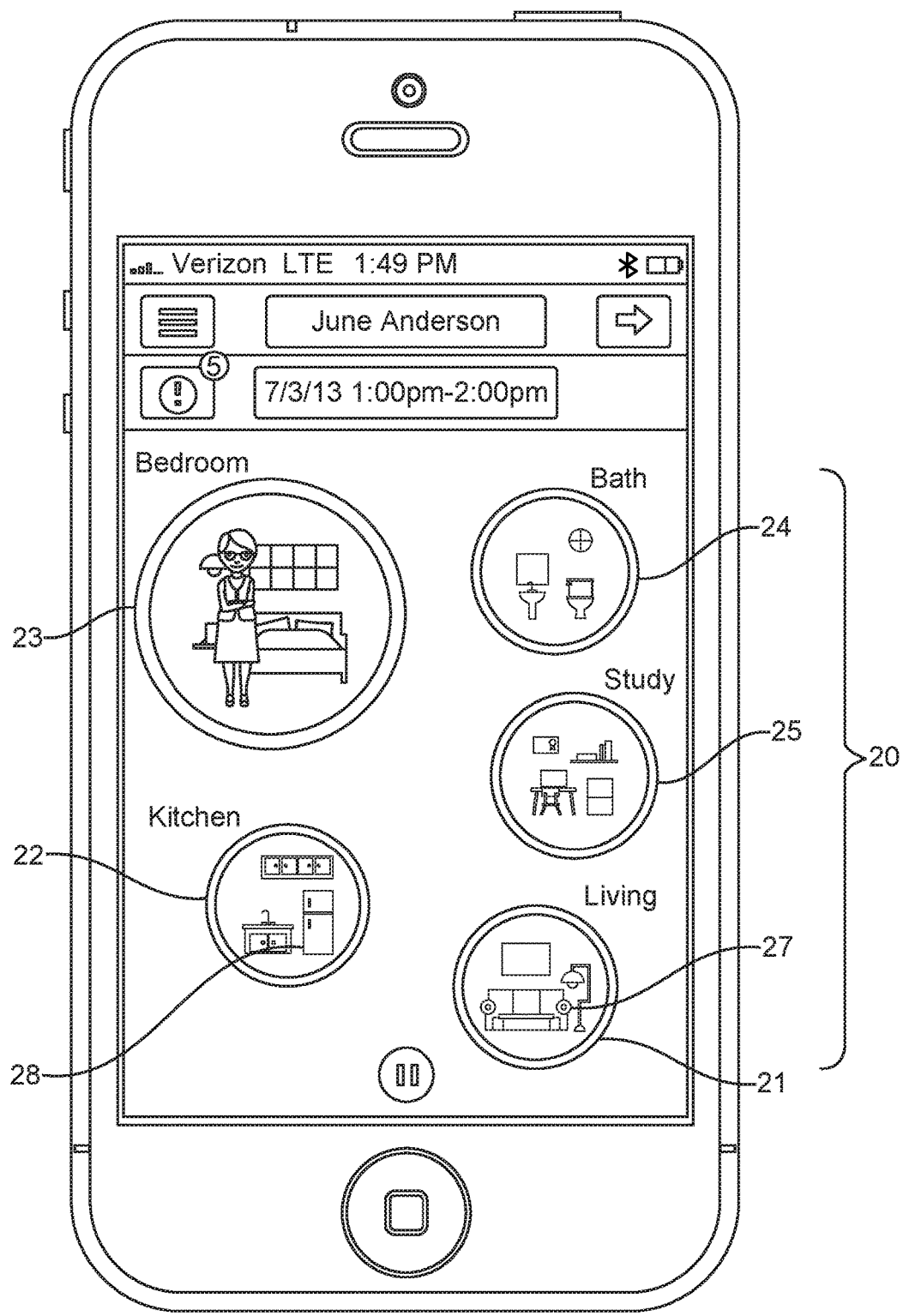
FIG. 5 shows a front plain view of a smartphone showing a schematic map of the invention created on the smartphone screen using the bubble icons.

An aspect of the invention is a smartphone program which allows the user to create a crude schematic diagram of the home (as shown in FIG. 4) of the person being monitored which schematic diagram can be used to visualize the presence of the person being monitored in the rooms shown on the crude diagram. FIG. 5 shows a different schematic representation of the home of the individual being monitored. Additionally, the screen can be programmed to show a time history of the motion, door openings and closing, temperatures and other measured parameters graphically by display of icons. This display can run forward in time or backward, e.g. showing current position of the person being monitored either first or last. The time spent in each room can be shown adjacent to the room icon.

System Hardware

The system utilizes a blend of environmental sensors which communicate through a home gateway computer which sends data to a monitoring application either through a wired internet connection or a cell phone connection depending on the home installation requirements.

The system operates on a 900 mHZ radio platform that allows the various sensors in the home to communication at a distance of up to 100 meters from the gateway computer.

The sensors are configured to push data to a specific user profile when the data is received based on the monitoring event. The system sends notification to the caregiver and company when batteries in any sensor runs low, signal strength is weak or the sensor has lost contact.

Motion sensors are used in the commonly used rooms of the home. The sensors are wall mounted and battery powered. Motion sensors are powered by two AAA batteries and may be mounted on a flat wall or a corner.

Temperature sensors are used to measure temperature at any place in the home. The ambient kitchen temperature and temperature under the stove hood are used to determine whether the stove is on. The temperature differential is set on the administration screen and the sensors are also powered by two AAA batteries.

One or more exit doors from the home as well as internal doors such as doors leading to the basement or garage can be monitored with a magnetic or optical sensor. The sensor can infer entrance or exit of the monitored individual based on the movement data immediately before or after the data is triggered. The sensor can detect if the door remains opened.

The system can include a personal emergency response device (PERS device) allowing the individual being monitored to alert caregivers or the company or a 911 system relating to an emergency situation. The PERS button is water resistant and operates only within the home. The PERS will be powered by a single 2032 coin cell battery. The system will send notification to the caregivers when the batteries run low, signal strength is weak or the sensor has lost contact. If the battery runs low a new unit will be shipped with a return mailer allowing for easy return of the PERS device.

The system may include a key fob attached to the keys of the individual being monitored. This makes it possible such that when the individual leaves the home those monitoring the system are aware of the departure. The fob indicates that the individual is out of range of the home monitoring system after the key fob reaches a distance of approximately 75 meters of the home. The key fob also sends notifications to those monitoring the system when batteries run low or signal strength is weak.

The system may include a pill box monitor which reports opening and closing of the pill box. The system can be programmed to send alerts if the pill box is not opened or closed on a basis connected to the habits of the individual being monitored. The pill box may be programmed to send alerts on a daily, weekly, hourly, or use basis depending on the needs of the individual being monitored. The pill box can detect the presence or absence of pills from the box and can detect low batteries or low signal strength and send notifications as appropriate.

The system can include a telephone monitoring device which reads telephone signals. The system detects calls dialed, calls missed and calls answered. The system may be designed to work with a conventional household phone through an RJ11 connector. The system includes a display device which provides the name of the caller if the number is in the system database and the telephone monitor is connected to the home gateway computer. The home gateway computer manages communication with each of the sensors and the central server. The gateway computer can work via a wired internet connection (RJ45) or a built in wireless cell connection. The wireless gateway computer operates on a limited data contract with a low monthly rate. The gateway is powered with standard residential power.

Accelerometer to Save Power

In several of the applications, in particular the key fob and the PERS monitor the device periodically sends a message to the system to show it is in operations. Although the device is not actively operated or moved by the elderly person, this notification consumes power and limits battery life. An accelerometer is provided in these devices to limit power consumption by only activating the device when it is moved.

Electrical Sniffer

A device is provided to monitor the electrical power usage of an appliance connected to the electrical system of the residence. This can monitor the current passing through the wire to the appliance passively by monitoring the electromagnetic field intensity in the wire connection to the appliance or can directly measure the current by measuring the voltage drop through a low impedance device in the circuit. These data are presented to the system through the wireless network.

Voice Response for Pers Notification

It is desirable to establish voice communication with the elder in the event of an emergency as indicted by use of the PERS alert. A voice contact system is provided from the elder home to the caregiver smartphone using contact thought the wireless communication system used by the monitors. This permits voice communication with the disabled senior to the communication hub or devices place in each appropriate room. Power can be provided by battery or by use of the home electrical system.

Motion of an Object

Accelerometers are provided in monitoring systems using an accelerometer (either 1 axis or 3 axis) to indicted that a device placed in the home has been moved, for example on a cabinet door.

Personal Occupancy

A pressure sensor is provided to enable the measurement of the change of force caused by the occupancy of a chair or a bed. Pressure change information is relayed to the system. For stability a dummy pressure sensor is also provided so that the bed or chair will not rock. In addition, the time variant changes in force may be used to measure the activity level of the person being monitored, for example for detecting restless sleeping.

Sharp Motion.

A three axis accelerometer can be provided to monitor and identify sharp motion or impact indicating a fall of the elderly person being monitored.

Alarm Cancel

In many cases involving PERS monitoring false alarms occur by accident or because the elder has decided that the alarm was triggered in error. A switch is provided on the base station to indicate to the system that the PERS alarm was triggered in error. The system will then respond with notification that the alarm has been cancelled.

Water Sounds

A monitor is provided to monitor toilet flush or other water flow in the bathroom. This system measures a sound level, characterizes it as water flow and indicates to the system the use of a water operated facility.

Humidity Measurement

A device to monitor the humidity in a room, such as a bathroom, is provided to indicate the prolonged use of the shower or bath.

Cameras

In many cases in monitoring of an elderly person it is useful to provide a photograph of some portion of the home. Bandwidth and privacy issues limit the use of real-time video photography. Thus, the system provides the ability to take snapshots of a critical area of the elder's home and transmit the photos to the system intermittently under the control of the monitoring person. The systems are purposely degraded in quality for privacy reasons. The system will be used on demand by the individual monitoring the elderly person when indicated by prolonged lack of activity, concern over falling in the bath or stairs, etc.

By using two cheap low speed cameras, motion can be detected by sending sequential images to the base station (where computing power is available) and motion can be detected from these sequential images. By using partial frames (e.g., 50×50 pixels) from each camera (where the camera included angle is 90 degrees) to determine where in the retina the motion occurs at a vector with an accuracy of e.g. 10 degrees. From this it is possible to determine where in the room the moving object is with respect to the baseline of the cameras. This mechanism permits identification of two objects simultaneously.

Medical Measurements

The system supports the use of certain medical measurement and transmits these data to the system for recording and review by the caregiver. For example, but not limited to blood pressure, weight, serum glucose, INR, pulse oximetry.

More than One Person in Home

More than one person may be in the home at any given time. It is difficult to provide a program that will track the history of two or more individuals and display their positions. Therefore a test is provided to make an estimate that there is more than one person in the home. This test measures motion that occurs more often in any two rooms more than two times in any minute. Such a condition will indicted to the program that data for individual room position of the person being monitored should not be displayed on the screen using room geometry or that a warning on the screen should be given. Other location and time tests may be used based on conditions and experience with each monitored elder.

Minimizing Information of Screen Showing Time History

On the screen (FIG. 3, 5 or 6) an indication of the time history of events may be shown. For clarity it may be useful to connect the dots showing to the user that one event clearly follows the next in time. This may be difficult to read because in many cases the adjacent rooms do not have adjacency on the schematic screen representation. To minimize the total length of the lines on the screen the lines indicting information about rooms and doors may be moved on the screen to positions where the most frequent motions are near each other on the screen. This can be done by manually moving the room/door to positions that minimize the length of the lines, or done automatically from time to time based on data from historical measurements for an individual.

Schematic Home Diagram

Figure 6:
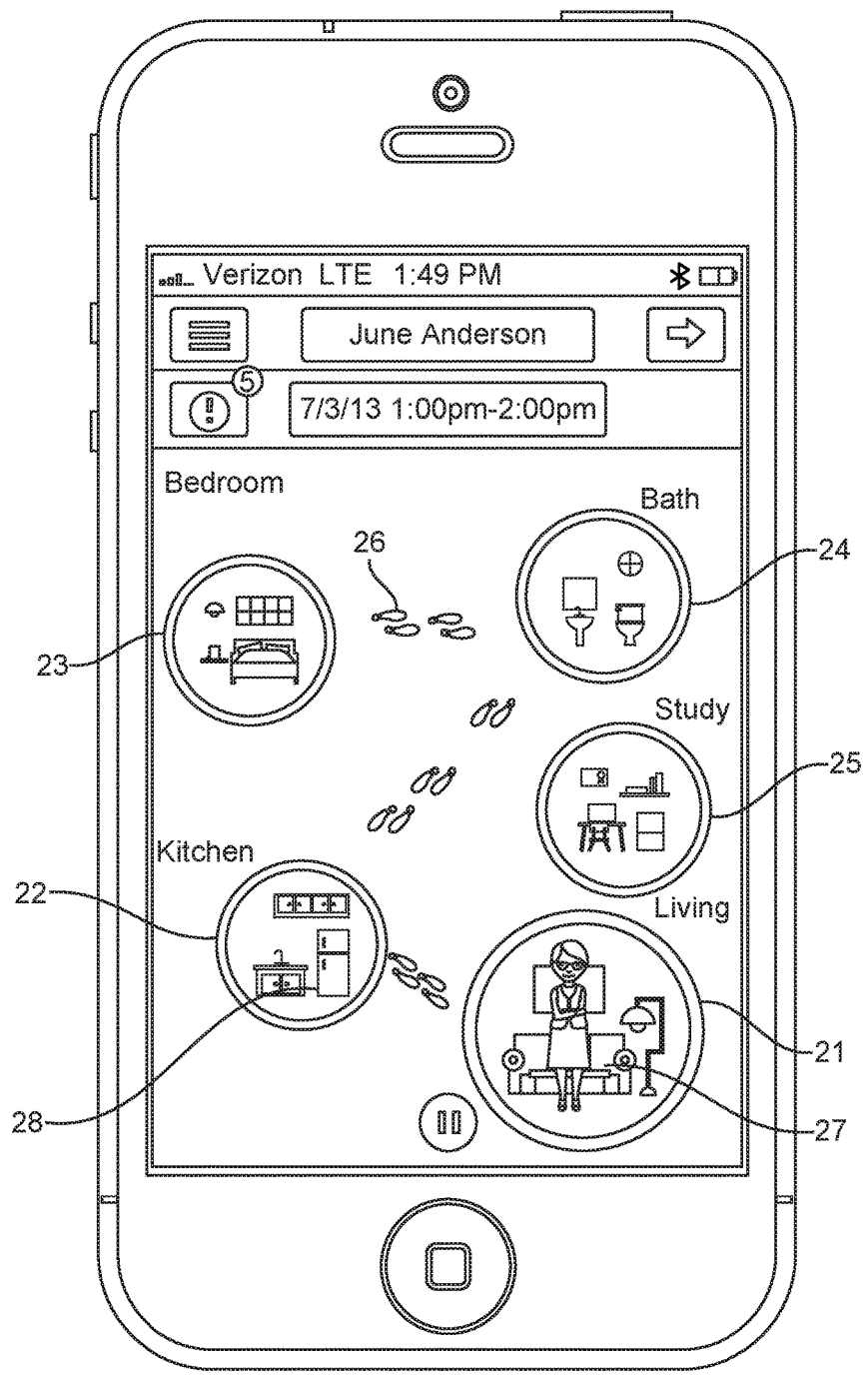
FIG. 6 shows a front view of smartphone screen showing a schematic map created on the screen and showing footprints schematically demonstrating footprints showing movement of the person being monitored.

FIG. 4 shows five different bubble icons which can be used in the creation of a schematic map shown in FIGS. 5 and 6. Within FIG. 4 the icons represent conventional rooms generally found in a home such as a living room 21, kitchen 22, bedroom 23, bathroom 24, and study 25. There is an icon 29 also shown which represents the individual being monitored.

The bubble icons shown within FIG. 4 already include some items. For example a couch 27 is shown in the living room 21 and a refrigerator 28 is shown in the kitchen 22. However, the items may be present separately and added to the bubble icons as needed. The bubble icons of FIG. 4 are drop-and-drag symbols on the screen which are used to make up the schematic map shown in FIGS. 5 and 6.

The monitoring system of the invention includes a program by which the user forms a crude schematic diagram 20 of a home of an individual 29 being monitored as shown in FIG. 5 using the bubble icons of FIG. 4. The program allows the user to click and drag a bubble icon of FIG. 4. FIG. 5 shows a schematic map of a house with icons which may be selected from the group consisting of living room 21, kitchen 22, bedroom 23, bathroom 24, study 25, dining room, spare room, hallway, stairs, door, study, porch, patio, and any area to be designated by user. The program simply clicks on any one of the bubble icons of FIG. 4 and drags the icon to a map where a room, hallway, or door may be created.

The user only includes items (rooms or areas) which include monitoring devices of the system of the invention. Accordingly, the map allows the user to monitor the presence of the individual being monitored within any of the areas created on the crude schematic map 20 of FIG. 5. The presence of the individual 29 may be represented by any geometric shape, including feet 26 as shown in FIG. 6, a circle, or an outline of a human body similar to the icon 29. Accordingly, after the crude map 20 is created and the monitors are included within the rooms, the person carrying out the monitoring can activate the program, bring up the map on the program and determine the presence of the individual being monitored within the areas of the home which are monitored. Information can be provided such as when the individual being monitored was in any given area of the home showing an entry time and an exit time. Further, the system can be designed such that if an individual remains in certain areas of the home beyond a given period of time an alarm is set off.

The map or schematic diagram 20 of FIG. 5 is not intended to provide an accurate geometrical map of the home. Alternatively, the program provides ease in creating the map 20 and designated areas familiar to the individual carrying out the monitoring. The system includes simple drag-n-drop label bubbles of FIG. 4 which can be arranged relative to the spacing positions of the rooms in the subject's home. The program can include spacing in order to designate room-to-room spacing within the home and the bubble icons of FIG. 4 can be expanded to include doors, walls, windows and stairs as appropriate.

In addition to the icons which can be dragged to create the schematic diagram of the home the program may include larger items typically present within a home such as a bathtub, sink, shower, bed, TV, couch 27, chair, table, stove, refrigerator 28, and washer/dryer. These items are shown in the rooms in FIG. 4 but may be separate and can be dragged into the rooms created on the crude diagram 20.

The system can detect movement of an individual within a room. Further, the system can actually show an image which image may be distorted in order to maintain the privacy of the individual being monitored. Further, the images transferred can be motion picture images or snapshots at a given point in time.

The map 20 can be connected to a range of monitors within the home which include monitors of the humidity in order to determine use of a shower or a bathtub. Monitoring the position and locking of a door, room temperature, stove temperature using a thermal couple thermistor or other temperature measuring device in order to determine if the stove is on. The individual being monitored may carry a signaling device which may be in the form of a key fob connected to keys normally carried by the individual. The signaling device may be attached to an accelerometer which measures movement and sends a signal to the device to activate when movement is detected thereby saving power during times when there is no movement. The signaling device may be set to send an alarm based on various parameters such as movement over a certain distance away from a central location or lack of movement within a certain location over an extended period of time. For example, an indication that the person being monitored is located in the bathroom for extended period of time, could be an adverse event.

The individual being monitored can wear a PERS button or button on the key fob on a pendant or on another part of the body such as the wrist where the device is worn in the same manner in which a watch is worn.

The system can be programmed to monitor motion of devices such as a refrigerator or stove door, the opening and closing of a pill box, the use of a telephone, TV, microwave or lights. In addition, the system can monitor water flow, current flow and the thermostat within the house. The display screen which includes the schematic map of the home can be programmed with the system to indicate the last known position of the individual. Inquiries can be made of the system to determine positions over a period of time such as positions within the last five minutes, ten minutes, fifteen minutes, or any increment of time. The map can show the position using an icon such as a circle, an outline of the feet of an individual or the outline of a human figure. The icon can be made to change colors or size depending on whether the individual being monitored is moving and can be made to blink during movement to show a steady image when movement discontinues.

Some of the measurements which can be shown on the schematic map of the home do not relate to movement. For example, the system can be programmed to show the absence of the key fob signaling device, show temperatures within different areas of the rooms, indicate the last position of an individual when an emergency button was activated and show the humidity within different areas of the home.

The system is designed so that all signals and locations may be time stamped and location stamped. Thus, the conceptual map can show forward motion and motion backward in time as well as providing an indication of when the individual being monitored was stationary. Alarms can be set so as to send a signal when the conditions move outside of certain parameters which can include temperature, movement, lack of movement, movement away from a central location by a predetermined distance or more.

The conceptual map display can be designed such that dots or other icons appear on the map and can be connected by lines indicating the direction of movement as time moves forward. Queries can be presented to the system so as to allow the individual monitoring the screen to determine movement during any particular time, ask for a replay of a movement during a particular period of time, ask for minimum or maximum lengths of stay within particular rooms and designate average times within different rooms or areas of the home.

The system can rely on triangulation of a position using two cameras with motion detectors. The triangulation can show position of an individual within a room and show relative motion within that room even without providing an image of the individual.

An aspect of the monitoring system of the invention is that the alarms can be sent to the person being monitored as well as to the person carrying out the monitoring. Thus, for example, the person being monitored may set the system to trigger an alarm if the stove is on beyond a set period of time thereby notifying the person that the stove needs to be turned off. Further, if a door is unlocked or left open or unlocked for a particular period of time an alarm can be sent to the person being monitored so that they are reminded to close or lock the door. Other alarms can be set such as providing an indication that pills should be taken at particular times of the day. Further, the person being monitored may take a nap but want to be awoken after a particular time and the system can be designed to send alarms during daytime hours if the person being monitored lies in a bed for a period of time beyond the alarm set period. By allowing the individual being monitored to be informed of certain information that individual develops a sense of control and thereby becomes more accepting of the monitoring system within the home.

Motion Pattern Based Alarm System

The monitoring system of the invention includes a plurality of monitors which are placed in different rooms throughout the home of an individual being monitored. In addition to monitoring the motion of the individual in the home other monitors can be included as described above and those monitors can include a humidity monitor in a bathroom, a weight monitor on the toilet seat of a bathroom, a pill box monitor, a temperature monitor on the stove in the kitchen, etc. Although providing these monitors and viewing the information in real time has value there is particular value in collecting data, noting patterns, and thereafter noting deviations from the pattern of the person being monitored.

The monitors can be used to collect data over a period of time. That period of time can be one day, one week, one month, two months, one year or any desired period of time. Once the data is collected it is analyzed in order to determine patterns. The patterns can be patterns of movements between rooms, patterns of movement within a room or patterns of activity such as taking pills, going to the bathroom, taking showers, turning on the stove, making coffee, etc. Once the pattern is established the system is set to send an alarm or notification when the pattern is deviated from by a given amount. That given amount can be a small percentage amount such as 10%, 20%, 30%, or more etc. or a larger amount such as 100%, 200%, 300%, or more etc.

The movement and activities of the individual being monitored can also be compared against a standard norm of movement and activity. Thus, for example, the toilet or toilets in the home can be monitored. They can be monitored with respect to the number of times flushed, and/or a number of times weight is applied to the seat. Using such monitors the system deduces that the individual urinated and/or defecated. If the person's pattern deviates from their normal pattern or from a standard established pattern by a set amount which can be programmed into the system then the system sends a notification or triggers an alarm. Thus, for example, if the individual being monitored is analyzed as having not expelled waste for a period of 24 hours this would be an indication of abnormal behavior and a potential health problem. Failure to urinate several times a day could be a distinct indication that the person is dehydrated.

Additional monitors could be included within the system. Examples of such monitors could include weight and/or moisture monitors on feeding bowls for pets such as cats or dogs, moisture monitors in plants, monitors on televisions, radios, coffee makers, record players, etc. Each can be monitored and use patterns can be established. Thereafter, the individual's daily movement can be compared against the previously established pattern and/or compared against a known standard with notifications and/or alarms being set upon deviation from that standard. Thus, for example, if the feed and/or water bowl of a pet has not been moved in a period of 24 hours the system could send a notification or alarm. Further, if the TV channel was not changed for a period of 3 hours or more a notification of alarm could be sent. TV controls could be measured by different types of monitors including monitoring infra-red signals sent from a remote control.

Before setting up the monitors and choosing which monitors to use the individual being monitored may be asked a series of questions. Those questions could include (1) do you have a pet?; (2) do you feed the pet at the same time every day?; (3) do you watch TV?; (4) do you tend to watch TV at the same time every day?; (5) do you cook?; (6) do you garden?; (7) do you travel outside of the home?; (8) do you have meals outside of the home?; (9) do you use bathroom facilities outside of the home?

Once obtaining answers to the questions a degree of judgment can be used regarding which monitors would best be put in place in order to monitor the individual for the purpose of establishing patterns and detecting deviations. Thus, the overall system includes asking a series of questions, analyzing the answers to those questions to determine which monitors to place in the home and where, installing the monitors, reading the information from the monitors, collating the information and determining patterns relative to the individual being monitored, programming the system to send notifications and/or alarms when one or more patterns is deviated from.

In addition to carrying out monitoring and analyzing data as suggested above in order to set alarms the system is designed to include feedback from the individual being monitored. Thus, if alarms have been, for example, set to go off due to deviation from a pattern and the individual being monitored knows that the pattern is deviated from on an irregular basis the individual can provide feedback. That feedback can be used to reconfigure the alarm, eliminate the alarm completely or send a different type of alarm indicating that although the pattern has been deviated from this deviation is considered low level and might be ignored or not given the same level of attention as other alarms. Thus, the system can generate alarm signals by itself, propose alarm signals which can then be entered or have alarms manually entered based on information obtained from either the person being monitored or the person carrying out the monitoring. The object of the system is to provide a simple system which can be installed and easily used without much interaction while still allowing the system to be customized if the user desired specific customization.

Additional Features

The monitoring system of the invention is designed with the simplicity of the installation of use in mind. Accordingly, substantial additional features are not necessary and for some users not desirable. However, some users require additional information and as such the system of the invention can be designed with added features.

In reviewing the map 20 as shown in FIG. 5 and the footprints as shown in FIG. 6 it can become confusing when there is ambiguity with respect to the direction of movement between different bubble icons and this is particularly true when the path is traversed numerous times. Accordingly, the system can be designed such that the older footprints fade over time so that the newer footprints indicate a clear direction from one room to another. Further, all previous paths between icons can be hidden unless requested. Thus, only the most recent footprints or lines of movement are shown between any two bubble icons.

The system can be designed to include a sensor such as a crude electronic scale which fits under the leg of the bed, chair or other item in order to detect that the person being monitored has applied weight to that object. Accordingly, this would make it possible to determine, for example, that an individual is in the bedroom but not in the bed. Further, movement on the bed could be detected by changes in position such as the weight of a leg of the bed and lack of movement in the bed over a significant period of time could be the basis for an alarm setting when no movement is detected after a set period of time or more.

Devices weighing a bed, chair or other object can measure the time averaged force on the sensor. Accordingly, if the time average is long (for example 10 seconds) it can indicate the presence of a person by comparing the force to an earlier value. If the force is viewed with fine time resolution it can indicate motion during sleep. Further, when there is more than a single individual in the house the difference in weight between the individuals can be used to track one individual relative to the other.

The icon bubbles can show a period of time spent within a given room. Thus, for example, within FIG. 6 the icon 22 representing the kitchen includes a number "73" to indicate the number of minutes an individual has spent in that room. The bubble icons as shown within the maps in FIGS. 5 and 6 can be allowed to change in size. The size of the bubble can, for example, increase when an individual is present in that room. Other indications can also be provided such as changing the color, including a highlighted surrounding around the icon or other signaling indications which are associated with the presence of the individual in that room.

In addition to showing the amount of time spent in the room the icon can be designed to show the number of visits to that room in any given period of time. Thus, a separate number from the time number can appear in the bubble icon showing the number of times an individual enters the room and provide an alarm if the individual enters the room over a given number of times or if the individual does not enter the room a set minimum number of times within a set period of time.

Separate monitors such as a temperature monitor on the stove and an ambient kitchen temperature monitor can be provided and information sent from those monitors can be shown on the bubble icon in the relevant room. Alarms can be programmed if the temperature exceeds a set maximum amount particularly if that maximum amount is exceeded over a given period of time. Further, indications of excessively low or high temperature incompatible with safety and well-being can be transmitted to the caregiver for remedial actions.

Many elderly people have caregivers who visit the elderly person on a regular basis. The presence of the caregiver can be determined in several ways by asking the caregiver to touch a particular monitor in the home. Further, the system can be designed so as to provide the caregiver the ability to send messages and update the individuals monitoring with specific medical information relating to the person being monitored.

The bubble icons can be provided with the doors or the doors can be added. The icons can be connected by lines or by feet outlines between the different icons. The map can be designed to only show activity within a certain period of time such as by indicating that activity should be shown only over the last 30 minutes, 60 minutes, 2 hours, 1 day, etc. Further, the system can be designed only to show the current place where the person being monitored is located. Thus, the system can be made more simple or more sophisticated depending on the particular needs and abilities of both the person being monitored and the person doing the monitoring.

For purposes of this section of the disclosure the person being monitored will be referred to as a senior in that the system and method of the invention is generally used in connection with monitoring an elderly person in their home when that elderly person lives alone or with another elderly person. Screens such as those shown in FIGS. 6 and 7 can be used to provide real time information relating to the person being monitored or can be used to replay past activities in order to determine where the senior has been over any given period of time in the past.

Figure 7:
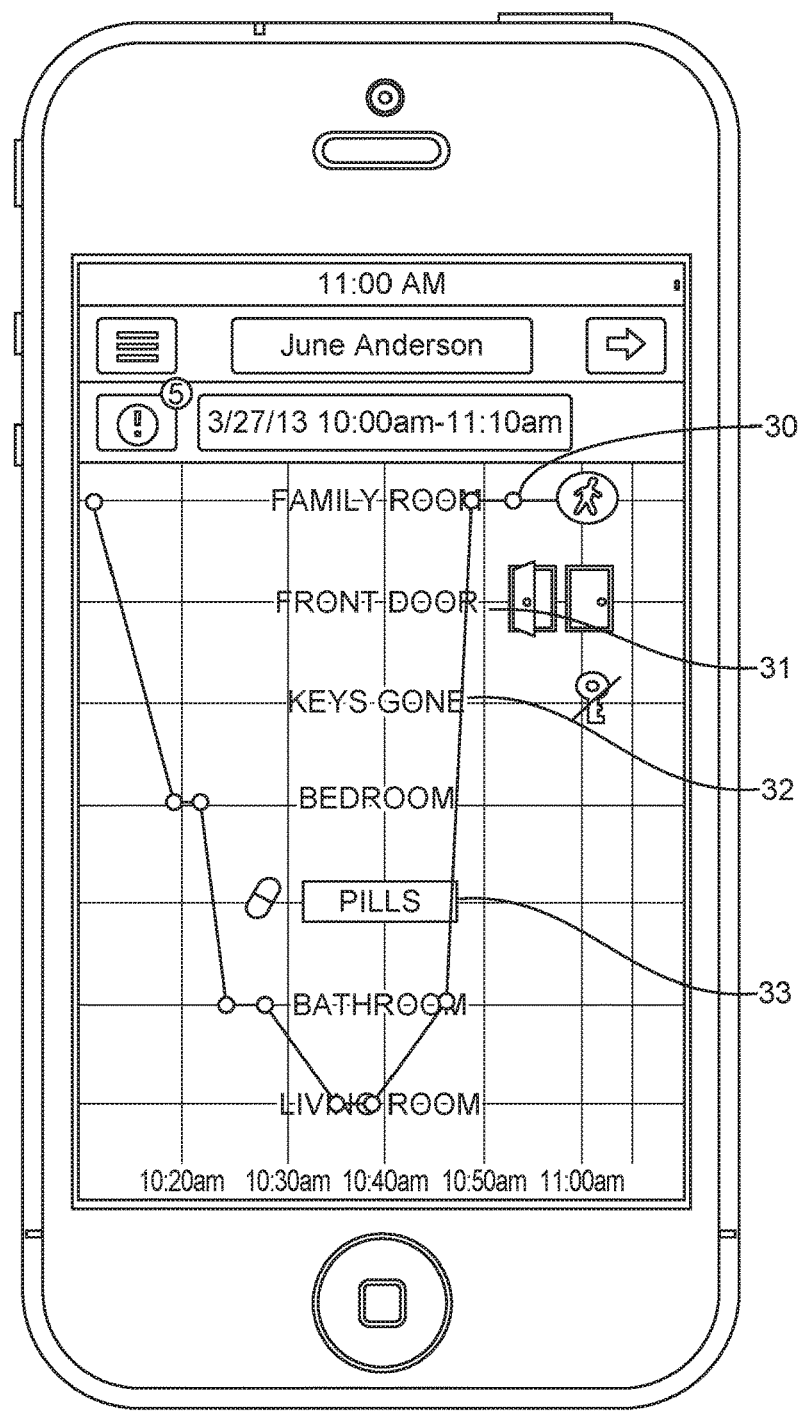
FIG. 7 is a front view schematically showing a different embodiment compared to that of FIG. 6 wherein specific text names appear on the screen.

As shown in FIG. 7 texts can appear on the screen to show, for example, the family room 30, the front door 31, or that the keys are gone at 32. To obtain the information sensors are arrayed in discrete locations that indicate motion in specific locations in the home, apartment or other living facility being monitored. Sensors may be arrayed at objects indicating occupancy such as the occupancy of a chair or bed in a particular room. The sensors may be arrayed to show the status of the object such as a door being opened or closed and may be used to determine temperature, humidity, sound, light, electrical current or motion.

The system can be set to send alarms based on the absence of motion. Key fobs can send signals within a given range but not beyond that range thereby indicating that the key is gone as shown in 32 of FIG. 7.

FIG. 8 shows specific times on a screen and relates those specific times to days of the week. Thus, the senior can be monitored with respect to the time the senior gets out of bed every morning. Alarms can be programmed to be sent if the wait time deviates a certain number of minutes or hours on either side of the average awake time. Thus, for example, an alarm can be sent if the awake time is before or after one hour of the average awake time during the last ten days.

Figure 9:
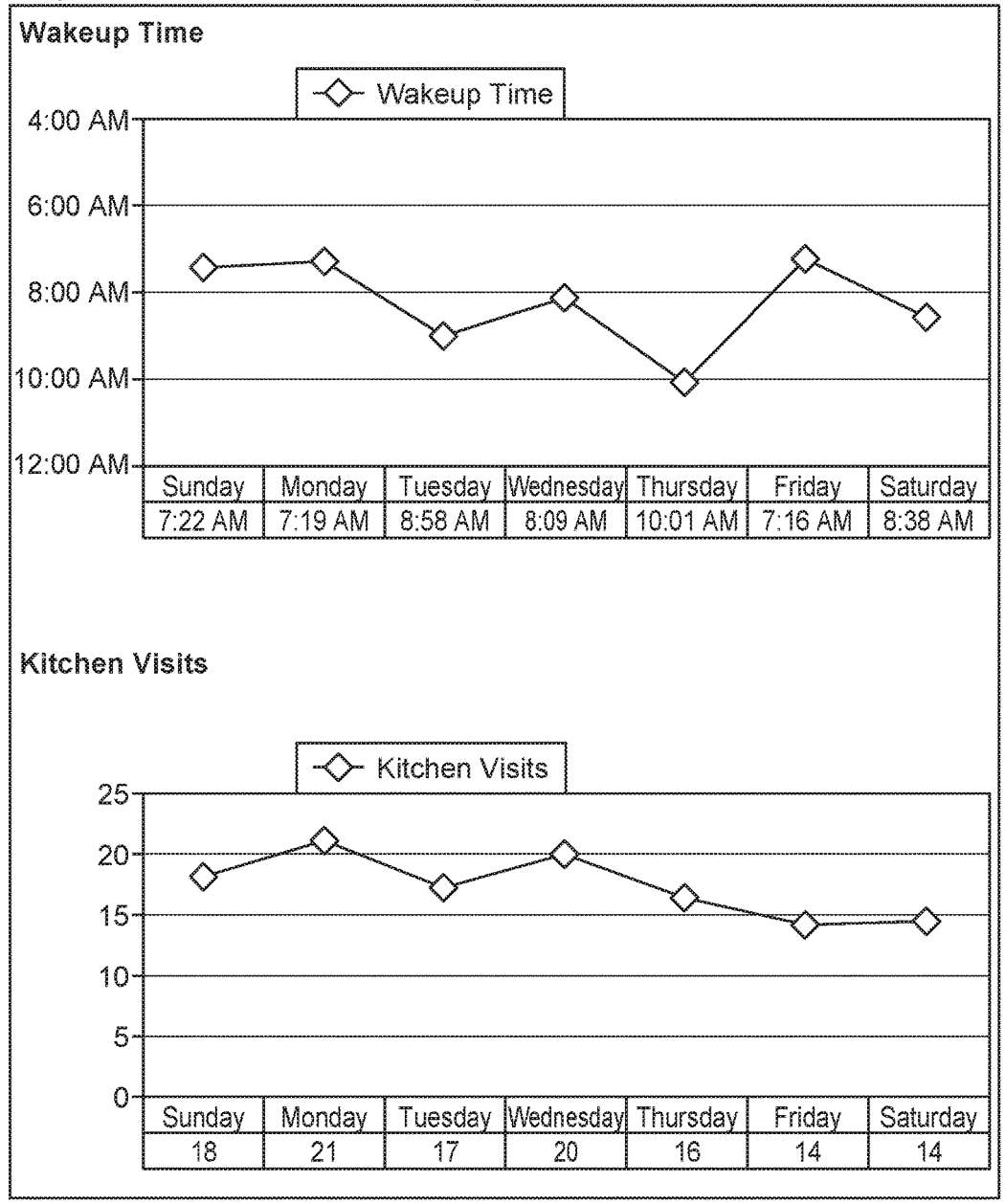
FIG. 9 is a graph showing the wake-up times and kitchen visits of an individual being monitored over the period of a week.

FIG. 9 shows information graphically with respect to times waking up and times entering the kitchen on each day of the week with the kitchen visits being shown with a number indicating the number of times the senior visited the kitchen on each day. Alarms can be set with respect to deviation from the norm so that if an individual is not visiting the kitchen as much as usual or visiting the kitchen much more than usual a signal can be sent indicating such.

Figure 10:
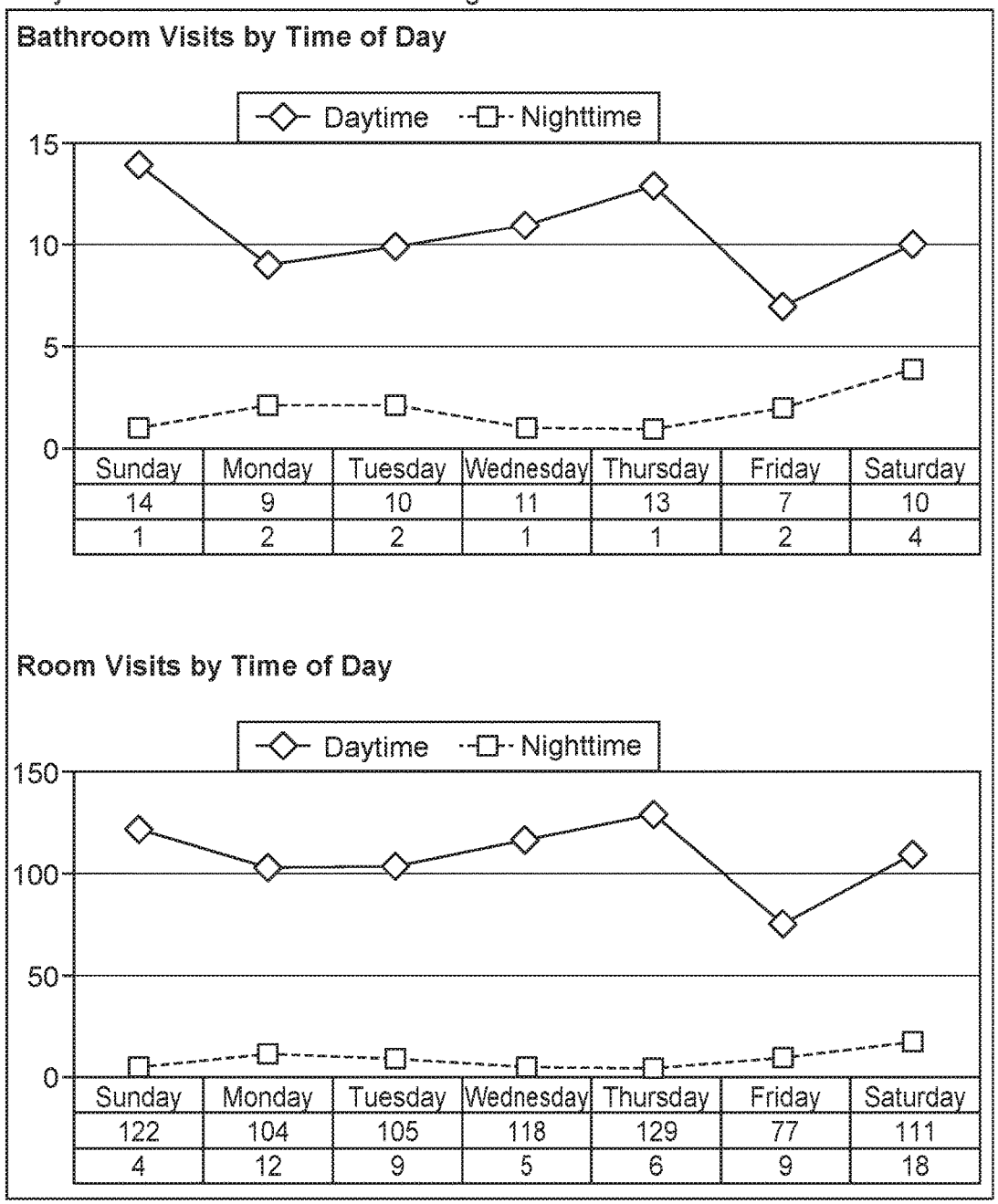
FIG. 10 is a graph similar to that of FIG. 9 but showing visits to the bathroom and room visits over the period of a week.

FIG. 10 is similar to FIG. 9 and shows a graph which monitors bathroom visits as well as visits to another room. The number of visits per day is shown for each day of the week and alarms can be set when the senior being monitored deviates from a normal pattern.

Figure 11:
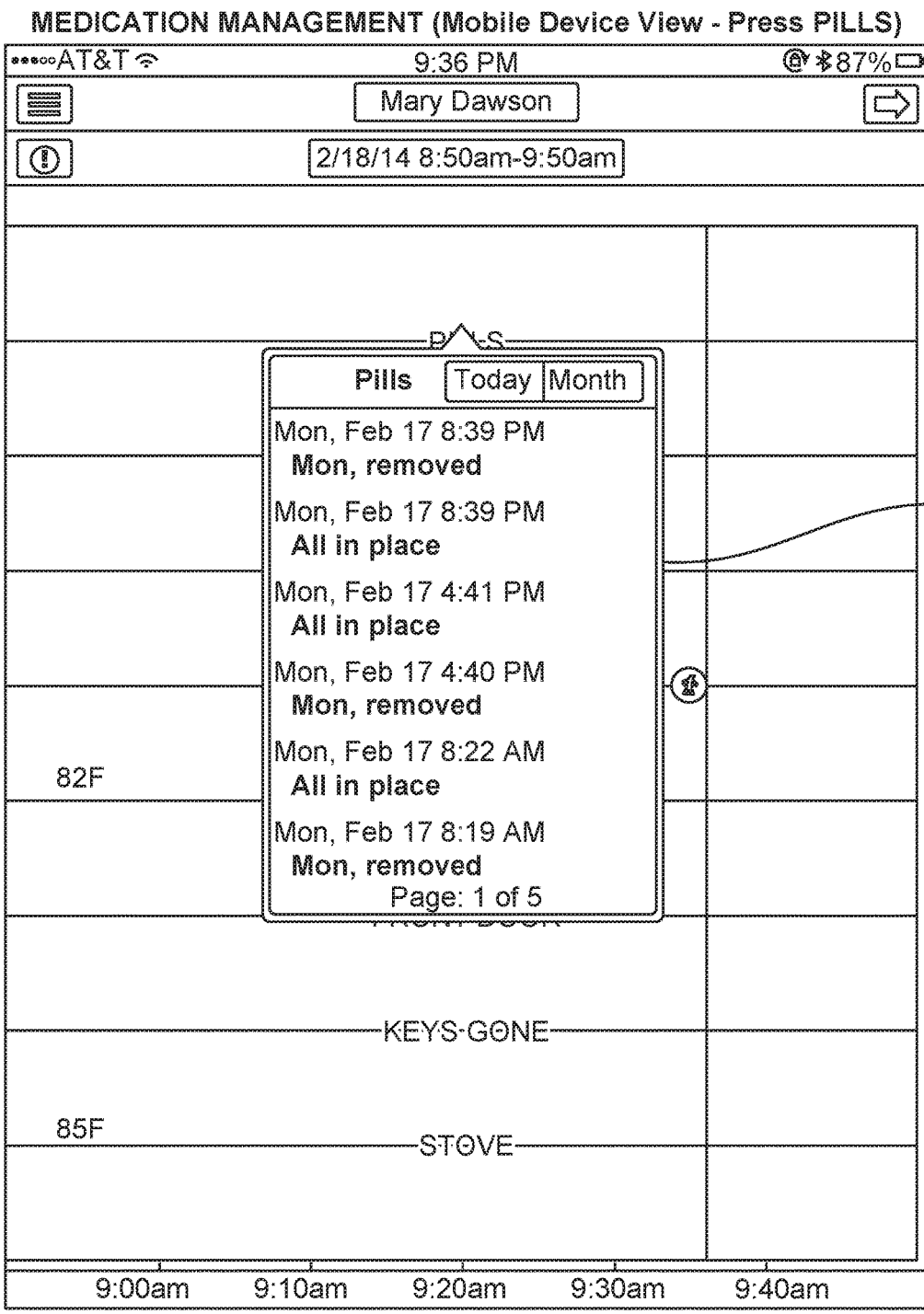
FIG. 11 is a schematic of a screen view showing details with respect to pill management.

FIG. 11 shows an expanded version of the "pills" icon 33 of FIG. 7. The expanded version is referred to as 34 in FIG. 11. The pills can be monitored to determine when all of the pills are in place or when pills have been removed and the time of removal. The ability to monitor pills in place and their removal is important to maintaining the senior on a desired treatment with respect to drugs the senior is supposed to take.

Data Collection

Different events can trigger data collection such as motion or the lack of motion such as the lack of motion over a given period of time e.g. 5 minutes, 10 minutes, 1 hour, 2 hours, etc. The intensity or amount of a measured parameter can be recorded and each measurement can be time stamped either relative to the transmission of the event or as the absolute time during which the event takes place. The system can record and chronologically list all measurements which can be sorted and accessed.

The system translates from events to positions in the home where the senior has been detected or infers measurements. Reference is made to FIG. 3 which shows different sensors and FIG. 5 which shows icons indicating the presence of the senior in different places. By noting movement at one location at one time and thereafter noting movement at another location it is possible to calculate the movement of the senior and the direction of their movement along with an expectation of where the senior will be next and thereby show the senior within a certain room such as the rooms shown on FIGS. 5 and 6. These data can be displayed in real time, on a smartphone or a computer screen and may be translated into data such as that shown for the kitchen visits in FIG. 9. Thus, an accumulation of the data can provide historical data as shown in FIG. 9.

Historical data can be displayed in scale time for example where three hours is represented in three minutes and thereby linearly scaled at a ratio of 60:1. However, non-linear scaling may be convenient for some purposes and long periods of inactivity or location in a single room may be represented by using different types of time scales.

Geometric Presentations

Rooms may be represented with icons such as the rooms shown within FIGS. 5 and 6 and the various room elements such as the bathroom 24 or living room 25 of FIG. 6 are elements which can be moved on the screen by a conventional drag and drop program and can be positioned correctly to show the adjacent rooms in the home of the senior being monitored. Further, multiple floors in the home can be designated by, for example, first floor, second floor, third floor, etc. and graphic representations on the screen can show dividing lines between the different floors. Preferably, the icons do represent some aspects of the actual rooms such as a sink and toilet in a bathroom, a TV within a living room, a stove within a kitchen, etc.

It is useful for the system to show an icon for the senior being monitored so that the location of the senior within a specific room can be determined. The icon of the senior can be overlayed on the room icon. Further, once the senior is overlayed on a particular room icon the size of the room, in accordance with the program, changes. Accordingly, a room is shown as larger when the senior is in the room thereby making it possible to monitor the movement of the senior within a specific room using a small smartphone screen. Doors are also shown connected to the room and the status of the doors as being opened or closed can be shown. By expanding the size of the room it is possible to expand the size of items within the room, such as a couch, a bed, shower, stove, etc. and thereby determine the proximity of the senior relative to those icons within the room.

Historical Representations

Graphical representations of where the senior is at any given time can be shown. However, the system can display the pattern of the senior in a room and throughout the house over a given period of time and the pattern can be scaled linearly or non-linearly between any two different time intervals. The linear variables can be 10:1, 100:1, 300:1, etc. and the data can be replayed so as to determine the activity of the senior throughout the house over a very long period of time. This data is useful in showing the room to room motions over time of the senior and can be useful in determining how to set and then send alarms when the activity of the senior over a given period of time varies from a norm by a set percentage e.g. 10%, 50%, 100%, etc.

Multiple Sensor Interaction

A determination of a period of time that a room is being occupied based on a signal from a motion sensor in that room and then the lack of signal or termination of signal from that sensor indicates that the senior was in the room and left the room to enter a different room. A determination of the time interval between when the senior entered the room and left the room establishes the time the senior was in the room and date stamps can be applied to motion signals for entering and exiting a room. Information on entering and exiting a room can, in addition, be determined by the motion of the door which can be attached to a sensor. The door sensor can be placed on doors inside the home and doors which lead out of the home thereby indicating the person has opened an exterior door leaving the home. If an exit door for leaving the home is opened, then closed and motion is not detected the system assumes the senior has left the home. Similar calculations can be made with respect to different rooms when door sensors are placed inside the home.

The coordination of two or more sensors in providing information makes it possible to calculate movement and calculate the lack of movement as indicating the senior has left a room or left the home. By showing motion from the sensor in one room such as the bathroom 24 in FIG. 6 followed by motion in another room such as the kitchen 22 it is possible to determine (and show on screen) the footsteps between the bathroom and the kitchen as shown in FIG. 6.

If the senior has entered the kitchen 22 as indicated above the presence of the senior in the kitchen can be coordinated with the temperature of the stove or a temperature reading of the ambient temperature in the kitchen based on the stove being turned on. If the stove is one and the senior is not in the kitchen over a given period of time an alarm can be sent. The alarm can be sent based on factors such as the coordination of multiple sensors showing no motion in the kitchen and higher than normal temperature in the kitchen over a given period of time.

The system becomes more complex when multiple individuals are in the home. The individuals being monitored can wear a device or hold a key fob which identifies which senior is being monitored. When no identifying signals is being sent from the senior being monitored it is generally not possible to differentiate from one person to another. The issue with respect to multiple persons is generally not problematic in that when multiple individuals are present in the home the two individuals have the ability to monitor each other and note any emergency situation. However, if one individual is incapacitated it is useful to include a monitoring device on the caregiver individual. If the caregiver exhibits a pattern of motion which is outside of the norm a signal could be sent particularly in situations where no motion is being detected in the home.

A key fob or monitoring device can include an accelerometer component which activates whenever the device is moved. If the device is set such that it does not send any signal if there is no movement the system can be set to send an emergency signal after a given period of time detecting no movement. By using a component which is only activated by movement it is possible to decrease the power output of the device which only sends a signal or comes "on" when motion is detected.

Furniture/Appliance Component

The system can indicate the occupancy of furniture or the use of an appliance. For example, force on furniture such as a couch or chair or movement in the room in the area where the couch or chair is present indicates occupancy of the couch or chair. Further, the humidity in the room can be measured and this is particularly useful in connection with some rooms such as a bathroom. Higher humidity indicates use of the shower or bath. The sound can be used to detect running water such as the running water of a shower or the flushing of a commode. If the commode is not flushed a certain number of times a day a signal can be sent indicating that there may be a problem.

Camera Images

Cameras can be placed in the home to facilitate monitoring. However, in accordance with the system it is possible to use degraded images which do not provide distinguishable information on the individual thereby providing for greater privacy. Further, the camera can be designed only to provide single frames of low resolution which improves the privacy of the senior being monitored.

Bubble Displays

A simple bubble display system as shown in FIG. 6 which is graphic images or text as shown in FIG. 7 can be shown on the cell phone of the individual monitoring the senior. These icons can be displayed on a smartphone, pad, or other personal computer. The icons are provided initially and are placed by a drop and drag program to obtain a particular configuration particular to the senior's home. Icons are provided for exit doors to the home and are selected by the same drag and drop program. It is possible to increase the size of a particular icon, provide a distinctive color, or otherwise distinguish a particular icon when the senior is determined to be in that room.

The presence of the senior within particular rooms and movement between them can be accessed in a playback mode of the system. The playback mode can be provided in different and adjustable time intervals such as every 15 minutes, 30 minutes, hour, etc. Icons can show the amount of time spent in each room over any given period of time and via the playback mode can determine where the senior was at any given time during a day, week, etc. The same playback mode can provide for movement of direction between rooms and within rooms such as moving to and from a pill box in order to take pills.

The data is stored and analyzed to produce a report which can be analyzed by the caregiver. The report indicates activity over specific period of time beginning with wake up times and continuing through bed times. The report includes kitchen visits, bathroom visits, time spent watching TV or outside of the home.

Medicine Dosing Monitoring

This system includes compartmentalized trays or a single tray for medicine to be dispensed to the individual. The tray is provided with instrumentation for an indication of the removal and replacement of subtrays containing daily medicines taken by the senior. An indication is provided to the system when a subtray is removed or replaced. Trays may be labeled for any given period of time including hours, multiple hours, days, weeks, months, etc. A tray may be labeled for a particular time of day thereby providing the senior with an indication that that tray should be removed and the medicine in that tray taken at a particular time. Removal and replacement of trays are sensed by magnets operating within the device. Removal and replacement of trays and sensed by various sensors such as LEDs and photodiodes. Data relating to the status of the tray being inside or removed or replaced is sent electronically, by radio, by wifi or any other suitable means.

WiFi/Internet Connection

As shown in FIG. 1 the monitors used in the system of the invention can connect with a central processing unit which connects to a smartphone where the monitoring takes place. The monitors and/or the central processing unit that can be connected by a WiFi system and the monitors can be designed to have WiFi access codes entered. The central processing system can connect to the internet and obtain information such as severe weather conditions including snow storms, tornadoes, the possibility of flooding, etc. This information can be provided to the smartphone and to the senior being monitored. Further, the outside temperature can be accessed and coordinated with a thermostat in the home in order to provide a suitable temperature for the senior and to adjust temperatures appropriately inside the home when the senior is not present thereby conserving on energy bills. This WiFi/internet connection which provides information is particularly useful to the person monitoring the senior when that person is located a considerable distance away and as such is not aware of the surrounding weather conditions.

The preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. A programmable monitoring system, comprising:
a plurality of monitoring devices for monitoring motion, each device comprising a peel off layer with adhesive underneath allowing attachment to a surface in a user home, and each marked with a unique tag readable by a smart phone camera and related software program;
a program for receiving information from the plurality of monitoring devices, wherein the program allows for alarms to be sent for each of the plurality of monitoring devices;
wherein the program allows the alarms to be individually set based on habits of an individual being monitored which habits are calculated by the system after monitoring the individual over a period of days and allows for a notification or alarm to be sent when a pattern of the habit is determined to deviate by a set amount from a norm;
wherein each of the plurality of tags is scannable by a camera lens and program of a smartphone allowing a smartphone user to tap an icon on the smartphone to associate the scanned tag with a room where the monitor will be placed;
wherein the habits are selected from the groups consisting of time of waking up, time of going to sleep, time of leaving the house, time of returning to house, time of eating, time of taking medication and stove temperature; and
wherein the program creates a screen comprised of a time line associated with each monitoring device.

2. The system of claim 1,
wherein the system comprises a program which generate icons on a screen which icons are representative of rooms in a home where monitors are placed.

3. The system of claim 1,
wherein the system comprises a program which expands a room icon on the screen when a monitor detects movement in that room thereby indicating the presence of a person being monitored in that room.

4. The system of claim 1,
wherein the system comprises a program which generate footstep icons on the screen representing movement detected between rooms which footsteps schematically represent movement of an individual between rooms.

5. A motion pattern based notification method, comprising:
asking an individual a series of questions relating to the behavior of that individual;
reviewing answers to the questions;
determining placement of motion sensors to install based on a review of the answers;
installing motion sensors in a home of the individual being monitored by peeling off a layer to expose an adhesive and adhering to a surface in the home, and the motion sensors installed based on determinations made based on a review of the answers to the questions;
obtaining data from the motion sensors relating to the behavior of the individual over a period of time;
analyzing the data obtained from the motion sensors in order to determine deviations from a pattern of the individual; and
sending a notification or alarm when the pattern is determined to deviate by a set amount from a determined norm;
maintaining electronic storage of data obtained from the motion sensors.

6. The motion pattern based notification method of claim 5, further comprising:
allowing the stored data to play back to show activity over any given period of time.

7. The motion pattern based notification method of claim 5, further comprising:
obtaining data from a monitored pill box indicating opening and closing of the pill box.

8. The motion pattern based notification method of claim 5, further comprising:
sending an alarm when the pill box is not opened over a predetermined period of time.

9. A programmable monitoring system, comprising:
a plurality of monitoring devices for monitoring motion, each device comprising a peel off layer with adhesive underneath allowing attachment to a surface in a user home, and each marked with a unique tag readable by a smart phone camera and related software program;
a program for receiving information from the plurality of monitoring devices, wherein the program allows for alarms to be sent for each of the plurality of monitoring devices;
wherein the program allows the alarms to be individually set based on habits of an individual being monitored which habits are calculated by the system after monitoring the individual over a period of days and allows for a notification or alarm to be sent when a pattern of the habit is determined to deviate by a set amount from a norm;
wherein each of the plurality of tags is scannable by a camera lens and program of a smartphone allowing a smartphone user to tap an icon on the smartphone to associate the scanned tag with a room where the monitor will be placed;
wherein the habits are selected from the groups consisting of time of waking up, time of going to sleep, time of leaving the house, time of returning to house, time of eating, time of taking medication and stove temperature;
wherein the program creates a screen comprised of a time line associated with each monitoring device;
wherein the system comprises a program which generate icons on a screen which icons are representative of rooms in a home where monitors are placed;
wherein the program generates objects generally present in a house and allows the objects to be dragged and dropped into any room generated on the screen.

* * * * *